Oct. 30, 1962 S. B. DUNHAM 3,060,747
CONDENSATION NUCLEI MEASURING DEVICE
Filed May 27, 1957
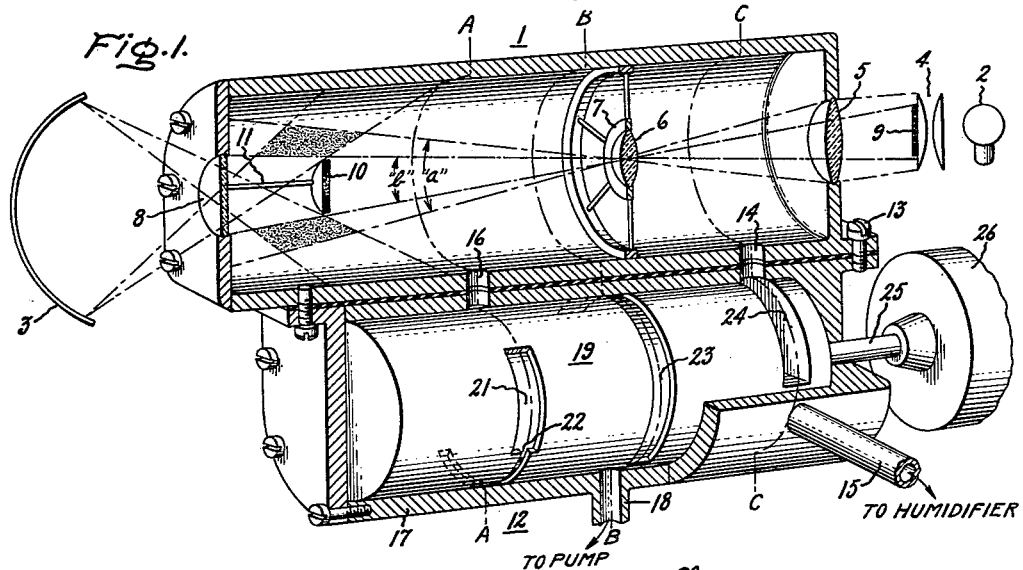
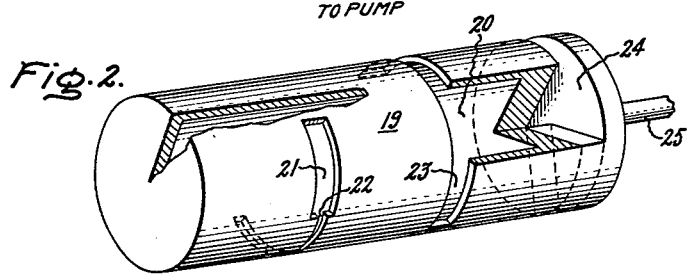
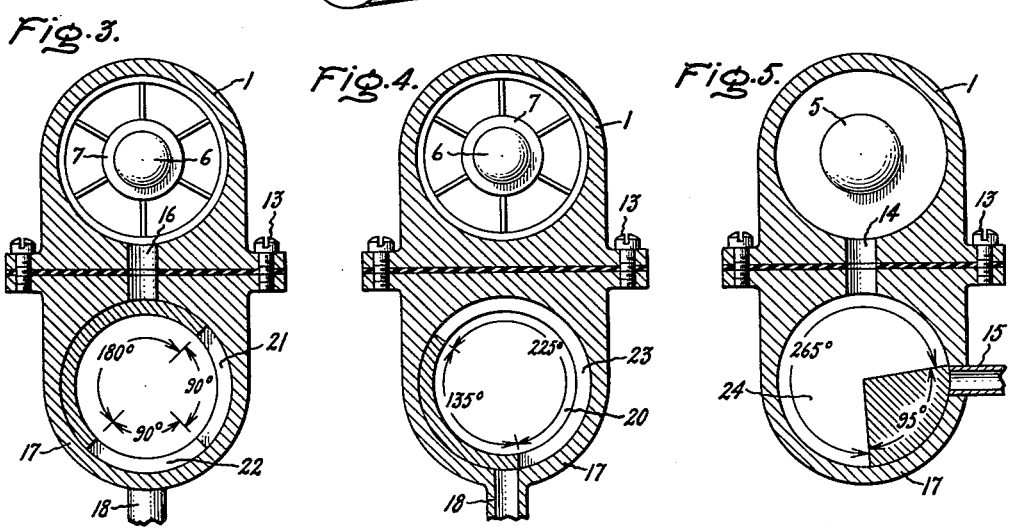
Inventor:
Stuart B. Dunham,
by Morton D. More
His Attorney.

United States Patent Office 3,060,747
Patented Oct. 30, 1962

3,060,747
CONDENSATION NUCLEI MEASURING DEVICE
Stuart B. Dunham, Schenectady, N.Y., assignor to General Electric Company, a corporation of New York
Filed May 27, 1957, Ser. No. 661,961
4 Claims. (Cl. 73—432)

This invention relates to a method and apparatus for detecting and measuring small airborne particles in the microscopic and sub-microscopic range and more particularly those known as condensation nuclei.

Condensation nuclei is a generic term applied to small airborne particles which are characterized by the fact that they serve as the nuclei upon which a fluid, such as water for example, condenses to form droplets. Such nuclei, as this term is understood in the art, include microscopic and sub-microscopic particles ranging in size from $10^{-4}$ cm. radius to $10^{-8}$ cm. radius. Although the term encompasses the above mentioned range, the most significant portion, numerically, extends approximately from $2.5 \times 10^{-7}$ cm. radius to $10^{-5}$ cm. radius.

Recent studies and investigations of airborne particles of the condensation nuclei type have brought to light the relationship of these particles to diverse human activities which are the sources thereof. The increasingly acute problem of air pollution, the study of combustion, and various other industrial processes represent but a fraction of those areas wherein devices and techniques for measuring small airborne particles accurately and rapidly are urgently needed.

Due to the size of these nuclei, however, there are certain inherent difficulties which are encountered in their detection and measurement since, as has been pointed out above, particles in the microscopic and sub-microscopic range are involved. Hence, the usual techniques involving light absorption and light scattering are inapplicable to the measurement of the nuclei per se, since these are small relative to the wave length of visible light. As a consequence, techniques have been evolved which rely on their characteristic property of acting as the nucleus of a fluid drop. That is, by causing the condensation of fluid about the nuclei their size is increased by many orders of magnitude so that available measuring techniques utilizing light may be advantageously used.

The mechanism involved in the condensation of a fluid vapor about such nuclei is related both to the instantaneous relative humidity (saturation) of a gaseous sample bearing them and on the size of the nuclei. If the humidity of a gaseous mass tends to rise above 100%; i.e., becomes supersaturated, as would occur by sudden cooling of at least a portion of the mass, an unstable condition exists and condensation starts the deposition of the fluid on the nuclei to achieve equilibrium. The deposition of the fluid on the nuclei continues until the humidity is lowered to a new equilibrium condition representing substantially 100% relative humidity for the new temperature.

One approach utilized in the past for producing the abrupt cooling necessary to produce supersaturation and trigger the condensation mechanism is an adiabatic expansion of the gaseous mass. However, as the demands of the technology become more sophisticated and instruments of ever-increasing accuracy and flexibility are needed, precise control of the expansion becomes increasingly important in achieving the desired optimum performance and, hence, the manner of controlling the expansion is subject to more rigorous criteria.

It can be shown mathematically that the degree of supersaturation achieved is proportional to the ratio of the initial pressure to the final pressure of the gaseous medium after expansion, and as a consequence the size of particle and the total number detected is dependent thereon. Consequently, the accuracy of a nuclei measuring instrument utilizing expansion produced cooling is dependent on maintaining this ratio of initial to final pressure constant.

In the prior art devices the adiabatic expansion to which the samples are subjected may be achieved in different ways. One of these is the so-called volume defined expansion wherein either a piston, a bellows, or a diaphragm is moved in a geometrically defined manner to expand the sample. Although adequate for many purposes, a faster expansion and operational speed may be desirable where rapidly changing nuclei levels are to be measured.

Another prior art approach is the so-called pressure defined expansion wherein the humidified nuclei bearing samples are subjected to a fixed pressure differential by being expanded to a fixed lower pressure by means of a pump or the like. One example of this type of apparatus is the so-called Nolan Counter which is described in Proceedings of the Royal Academy, vol. 51, section A, No. 2 (1946). Devices of this type, however, are extremely sensitive to variations in initial and final pressures of the expanded sample. Thus, the supersaturation changes even though the pressure differential remains the same since the ratio of initial to final pressure has changed. Such a pressure defined instrument is consequently altitude sensitive.

By utilizing a vacuum defined expansion the desired speed of expansion and operation as well as insensitivity to altitude may be achieved. That is, the nuclei bearing samples are expanded from the volume of one chamber into the combined volume of it and another, the latter of which has been kept substantially at vacuum. In such a system the ratio of the initial to final pressure is dependent only on the ratio of the two volumes and, consequently, changes in initial pressure due to such factors as changes in altitude do not affect the degree of supersaturation achieved and hence the particle size on which condensation commences.

It is an object of this invention, therefore, to provide a compact, accurate, and fast acting apparatus for measuring condensation nuclei.

Another object of this invention is to provide a condensation nuclei measuring device which is not sensitive to ambient pressure variations.

A further object of this invention is to provide an apparatus for measuring condensation nuclei which is not altitude sensitive.

Still another object of this invention is to provide a condensation nuclei measuring device utilizing the vacuum expansion principle.

A still further object of this invention is to provide a condensation nuclei measuring device wherein the distances between the components is minimized providing fast overall response.

Other objects and advantages will appear as the description of the invention proceeds.

In accordance with the invention the foregoing objects are accomplished by providing an apparatus including a combined valve and vacuum sink arrangement. In this fashion the humidified nuclei bearing gaseous samples are periodically expanded into a vacuum sink or chamber, which is an integral portion of the valving means. In this manner the accuracy attendant to a vacuum expansion is achieved, the valve porting is simplified and the distance between components is made as small as possible. Thus, there is provided an instrument which has a very fast overall response and which, additionally, is simple and compact of construction.

The novel features which are believed to be characteristic of this invention are set forth with particularity in the appended claims. The invention itself, however, both as to its organization and method of operation, together with further objects and advantages thereof, may best be understood by reference to the following description taken in conjunction with the accompanying drawing in which:

FIGURE 1 is a view partially in cross section of the novel apparatus of the invention;

FIGURE 2 is a perspective view, partially in cross section, of the combined rotor and vacuum sink of the valve element of FIGURE 1;

FIGURE 3 is a section taken along the lines A—A of FIGURE 1;

FIGURE 4 is a section taken along the lines B—B of FIGURE 1; and

FIGURE 5 is a section taken along the lines C—C of FIGURE 1.

Referring now to FIGURE 1, there is shown an embodiment of a condensation nuclei measuring device illustrating the principles of the instant invention. There is provided a chamber 1 adapted to hold humidified nuclei bearing gaseous media which are periodically subjected to a vacuum defined expansion to form droplet clouds about any nuclei present therein. The expansion chamber 1 is constituted of a hollow cylindrical chamber member into which nuclei bearing samples are periodically introduced and which samples are periodically permitted to expand into a vacuum sink to initiate the condensation mechanism.

There is provided a means to subject samples in the chamber 1 to a periodic vacuum defined expansion to form the droplet clouds. This expansion means includes a combined valve and vacuum sink assembly into which the samples are periodically expanded. To this end there is provided a valve assembly 12 which may be fastened directly to the chamber 1 by means of bolts 13 or any other suitable fastening means. The valve assembly 12 permits periodic communication between an inlet port 14 in the expansion chamber 1 and an inlet conduit 15 to permit the periodic admission of humidified nuclei bearing samples into the chamber.

In addition, the valve assembly permits the periodic communication between an outlet port 16 in the chamber 1 and a vacuum sink to permit the periodic expansion of the samples. The valve assembly 12 consists of a valve body 17 having a cylindrical bored portion therein. The input conduit 15 extends through the valve body and forms, in conjunction with the port 14, a communicating channel for bringing in fresh samples. An output conduit 18 extends through the valve vody 17 and comes into periodic communication with the vacuum sink therein and is connected to a source of lower pressures such as a vacuum pump, not illustrated for the sake of simplicity, to provide the means for evacuating the vacuum sink. Positioned within the valve body 17 is a vacuum chamber defining rotor member 19 which provides both the valving action and a cavity or vacuum chamber within the rotor into which the nuclei bearing samples are permitted to expand.

The vacuum chamber defining rotor member 19, which can be seen most clearly with reference to FIGURE 2, contains an internal hollowed-out chamber or cavity portion 20 which is permitted to come into periodic communication alternately with the expansion chamber 1 and a source of lower pressures such as the pump connected to the conduit 18. The internal cavity portion 20 is placed in periodic communication with chamber 1 by means of an aperture member 21 which is so positioned on the surface of the rotor member 19 as to come into periodic alignment with the outlet port 16 of the chamber 1. A narrow restricted aperture 22 extending circumferentially around the rotor member and connecting with the aperture 21 provides a restricted portion to slow or retard flow of gaseous samples out of the chamber for a purpose which will be explained in greater detail later when the operation of the device is explained.

Axially displaced from the aperture 21 is a second circumferentially extending aperture 23 which is so positioned as to come into periodic alignment with the outlet conduit 18. This aperture permits the periodic communication of the source of low pressure, such as a pump, with the cavity or chamber 20 and thus permits the periodic exhausting of this chamber to produce a vacuum therein. Axially displaced from the aperture 23 is a third aperture 24 which functions to connect the chamber inlet port 14 periodically with the inlet conduit 15 in order to permit the periodic introduction of fresh samples into the chamber. The rotor 19 thus constitutes both a valving arrangement to control the periodic admission, expansion, and flushing out of the nuclei bearing gaseous samples, but in addition incorporates the vacuum sink into which the samples are expanded whereby the valve porting is simplified and the distance between the components is reduced to a minimum.

The rotor 19 is mounted on a shaft 25 extending through the housing 17 which is connected to a motor 26 which constitutes the means for rotating the valve rotor.

In order to achieve an indication of the number of nuclei there is provided a means to measure the density of the droplet clouds formed by the expansion of the gaseous sample. To this end there is provided a so-called dark field illuminating system which projects a beam of radiant energy through the sample containing chamber 1 in such a manner that it impinges upon a radiation sensitive device only if a droplet cloud is present. There is provided a source of radiant energy 2, such as an incandescent lamp or the like, positioned adjacent to one end of the expansion chamber 1. A radiation sensitive device 3 is positioned adjacent the opposite end of the expansion chamber and may be of the photomultiplier, photovoltaic or photoresistive type. The radiation sensitive device 3 positioned adjacent the opposite end of the chamber functions to intercept any light scattered in the expansion chamber by the periodic formation of droplet clouds therein.

The optical system positioned intermediate the source of radiant energy 2 and the radiation sensitive device 3, is so constructed and designed that no light falls on the radiation sensitive device 3 in the absence of a droplet cloud. A pair of condensing lenses 4 are positioned adjacent to the source of radiant energy 2 and in conjunction with the lens 5 positioned in the end of the chamber 1 function to focus the beam of radiant energy at a point within the chamber 1. Positioned at this point is a second lens element 6 which is fastened by means of a mounting element 7 to the walls of the chamber. Since the beam of radiant energy from the source 2 is focussed at the lens 6 this lens acts effectively like a source positioned at this point of the chamber.

Positioned on the face of one of the condensing lenses 4 is a circular opaque light barrier 9 which blocks a portion of the beam and produces a dark field illuminating system. That is, a cone of light subtending the angle "$a$" having a cone of darkness within subtending an angle "$b$" is produced by this construction. Mounted at the opposite end of the chamber 1 is a transparent member 8 directly in front of the radiation sensitive device. This light transparent member 8 is normally unilluminated in the absence of droplet clouds since the cone of darkness is of such dimension as to encompass the member 8 totally. In addition there is positioned in front of the transparent member 8 a second opaque member 10 supported by a number of strut elements 11 further to insure that no light impinges on the member 8 and the radiation sensitive device 3 in the absence of droplet clouds.

As a result, upon the appearance of a droplet cloud light in the angular volume which is illuminated by rays in the cone of light and which is in the field of view of the radiation sensitive device is scattered and impinges upon the radiation sensitive device 3. This angular volume is illustrated in FIGURE 1 by means of the dotted or dappled portion. As a consequence, the radiation sensitive device 3 intercepts a substantial portion of the light scattered by droplet clouds in the forward direction, but is maintained unilluminated in the absence of such droplet clouds. In this way a very sensitive means is provided for measuring only the number of droplets within the chamber 1.

The relative positions of the apertures 21, 22, 23 and 24 of the valve and the arcs which they subtend are such that in one operational cycle a fresh sample is introduced into the expansion chamber while the old sample is simultaneously flushed out, the fresh sample comes to equilibrium while the vacuum sink within the rotor is being evacuated down to an extremely low pressure approximately near vacuum, and then subsequently the sample is permitted to expand into said vacuum to trigger the condensing mechanism which provides the means for measuring the number of condensation nuclei present.

FIGURES 3, 4 and 5 which are sectional views on lines A—A, B—B and C—C, respectively, of FIGURE 1 illustrate the relative position as well as the relative magnitude of the apertured members 21, 22, 23 and 24, which are instrumental in achieving the above cycle of operation. As can be seen from FIGURE 3, the aperture 21 subtends an arm of approximately 90° whereas the restricted aperture member 22 subtends an angle of approximately the same magnitude. Thus, the vacuum chamber 20 will be in communication with the outlet ports 16 of the chamber 1 for approximately 180° of one operational cycle.

The aperture 23, on the other hand, which periodically brings the output conduit 18 and the vacuum pump into communication with the vacuum chamber in order to evacuate it subtends an angle of approximately 225° and is so positioned relative to the apertures 21 and 22 as to provide the operational cycle described above.

The aperture 24, on the other hand, subtends an angle of approximately 265° and, as a consequence, maintains the inlet port 14 and the input conduit 15 in communication for approximately 180° of the rotational cycle.

The following table illustrates quite clearly the relative operational condition of the various aperture members during the various portions of one operational cycle:

| Cycle | Inlet Valving Aperture 24 | Outlet Valving Apertures 21, 22 | Evacuation Valving Aperture 23 | Portion of Total Cycle, degrees |
|---|---|---|---|---|
| Flush | Open | Restricted (22) | Open | 90 |
| Fill and Evacuate | do | Closed | do | 90 |
| Dwell and Evacuate | Closed | do | do | 45 |
| All Dwell | do | do | Closed | 45 |
| Expand | do | Open (21) | do | 90 |

Referring now to the operation, during the Flush phase of the cycle the old sample is removed and a new sample begins to flow into the expansion chamber 1. At this time the port 16 of the chamber 1 communicates with the output conduit 18 through the restricted aperture 22 and the aperture 23 and the pump removes the old sample. Simultaneously, the aperture or slotted portion 24 comes into alignment with the port 14 and the input conduit 15 and a fresh sample starts to flow into the chamber 1.

Upon rotation of the rotor 19 the apertures 22 and 21 move out of alignment with the port 16 interrupting communication between the chamber 1 and the vacuum sink 20. Aperture 24, however, remains in communication with the ports 14 and the conduit 15 and the fresh sample continues to flow into chamber 1. The output conduit 18 during this period remains in communication with the aperture 23 so that the vacuum pump begins to evacuate the chamber 20.

During the next phase of the cycle, known as Dwell and Evacuate, the aperture 24 moves out of alignment with the port 14 and interrupts the flow of fresh sample into chamber 1. Aperture 23, however, remains in communication with chamber 20 and the pump continues to evacuate it.

Upon further rotation of the rotor 19, the aperture 23 moves out of communication with the conduit 18 and all of the communicating apertures are out of alignment with their respective ports and conduits and the system comes to equilibrium during this Dwell phase prior to the expansion of the sample.

During the next or Expand portion of the cycle the aperture 21 has rotated into communicating position with the output port 16 and the sample in the chamber 1 expands very rapidly into the vacuum chamber 20, thus lowering its temperature instantaneously and producing the supersaturated condition which initiates the formation of cloud droplets to produce an output from the radiation sensitive device 3. The cycle is then repeated in the same sequence to condition and measure the succeeding sample.

In the preferred embodiment illustrated in FIGURE 1, the vacuum sink defined by the rotor member of the valve assembly is internal of the rotor member. It is obvious, however, that it is not necessary to position the valve chamber or cavity within the rotor while yet maintaining it within the valve assembly as a whole. For example, the vacuum chamber into which the samples are to expand may very well be constructed by making the axial length of the rotor member shorter than that of the housing member and consequently producing a chamber or space within the valve assembly with which the various conduits and ports may communicate by means of apertures placed on the rotor member. In this fashion the rotor member still defines the vacuum chamber while yet not containing it directly. In this manner it may sometimes be possible to utilize a simpler construction for the rotor member while yet achieving all of the advantages of the instant apparatus, to wit, minimizing the distances between the various components and thus achieving the fastest overall response time.

From the foregoing description, it can be appreciated that the instant invention provides a nuclei measuring apparatus in which the gaseous samples are subjected to a vacuum defined expansion, thus eliminating errors and inaccuracies due to variations of the initial starting temperature and consequently making the apparatus independent of altitude and pressure variations, while yet providing an apparatus of great simplicity and very rapid response time.

While a particular embodiment of this invention has been shown it will, of course, be understood that many modifications both in the circuit arrangement and in the instrumentalities employed may be made. It is contemplated by the appended claims to cover any such modifications which fall within the true spirit and scope of this invention.

What I claim as new and desire to secure by Letters Patent of the United States is:

1. In a condensation nuclei measuring apparatus the combination comprising a first chamber adapted to hold nuclei bearing gaseous samples, means to subject the samples in said chamber to a periodic vacuum defined expansion including a rotary valve means having a rotor member, an internal vacuum chamber defined by said valve rotor, and apertured passage means on said rotor to permit the periodic evacuation of said vacuum chamber and subsequent expansion of said samples in said first chamber into said vacuum chamber, and means to measure the density of the droplet clouds formed by the expansion of said samples.

2. In a condensation nuclei measuring device the combination comprising a first chamber adapted to hold nuclei bearing gaseous samples, means to subject the samples in said chamber to a periodic vacuum defined expansion including a rotary valve means positioned adjacent to said chamber, said valve means including a rotor member having an internal chamber portion defining a vacuum sink, aperture means on said rotor communicating with said internal vacuum chamber to permit periodic evacuation of said vacuum defining chamber and subsequent expansion of the samples in the first chamber into said vacuum chamber, and means to measure the density of the droplet clouds formed by said expansion.

3. In a condensation nuclei measuring device the combination comprising a first chamber adapted to hold nuclei bearing gaseous samples, means to subject the samples with periodic vacuum defined expansion including a rotary valve means to bring said first chamber into periodic communication with a vacuum sink, said valve means including a hollow rotor member defining an expansion chamber which is periodically evacuated and functions as said vacuum sink, said rotor having an aperture which comes into periodic communication with said chamber to permit expansion of said samples from said chamber into said expansion chamber in the rotor, and means to measure the density of the droplet clouds produced by said expansion.

4. In a condensation nuclei measuring device the combination comprising a chamber adapted to hold nuclei bearing gaseous samples having inlet and outlet ports, means to subject the samples to a periodic vacuum defined expansion including a source of low pressure, a rotary valve means including a cavity containing rotor member having a first aperture, said aperture being adapted to communicate periodically with the inlet port of said chamber upon rotation of said rotor to introduce said samples, a second aperture communicating with said cavity, said aperture being adapted to connect said cavity alternately to said low pressure means to evacuate said cavity and the outlet port of said chamber to permit expansion of said sample, means for rotating said rotor means, and means to measure the density of the resulting droplet cloud in said samples.

References Cited in the file of this patent
UNITED STATES PATENTS

| | | |
|---|---|---|
| 678,338 | Harger | July 9, 1901 |
| 2,299,457 | Cahusac | Oct. 20, 1942 |
| 2,684,008 | Vonnegut | July 20, 1954 |
| 2,791,901 | Rich | May 14, 1957 |

FOREIGN PATENTS

| | | |
|---|---|---|
| 406,648 | Great Britain | Feb. 26, 1934 |

OTHER REFERENCES

Cloud Chamber of Counting Nuclei in Aerosols, by Bernard G. Saunders Review of Scientific Instruments, volume 27, Number 5, May 1956. Pages 273 through 277 are pertinent. Classified 88—14 SI. (Copy in Div. 7.)